US011164342B2

(12) United States Patent
Fuller et al.

(10) Patent No.: US 11,164,342 B2
(45) Date of Patent: *Nov. 2, 2021

(54) MACHINE LEARNING APPLIED TO TEXTURES COMPRESSION OR UPSCALING

(71) Applicant: Microsoft Technology Licensing, LLC, Redmond, WA (US)

(72) Inventors: Martin Jon Irwin Fuller, Warwick (GB); Daniel Gilbert Kennett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/700,820

(22) Filed: Dec. 2, 2019

(65) Prior Publication Data

US 2020/0105030 A1    Apr. 2, 2020

Related U.S. Application Data

(63) Continuation of application No. 15/994,464, filed on May 31, 2018, now Pat. No. 10,504,248.

(60) Provisional application No. 62/650,641, filed on Mar. 30, 2018.

(51) Int. Cl.
| | | |
|---|---|---|
| *G06T 11/00* | (2006.01) |
| *G06T 9/00* | (2006.01) |
| *G06T 1/20* | (2006.01) |
| *G06N 20/00* | (2019.01) |
| *G06F 12/02* | (2006.01) |

(52) U.S. Cl.
CPC .......... *G06T 11/001* (2013.01); *G06F 12/023* (2013.01); *G06N 20/00* (2019.01); *G06T 1/20* (2013.01); *G06T 9/00* (2013.01); *G06T 9/002* (2013.01); *G06F 2212/401* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 8,031,197 B1* | 10/2011 | Williams | .................. | G06T 1/20 |
| | | | | 345/501 |
| 2011/0115806 A1* | 5/2011 | Rogers | ...................... | G06T 9/00 |
| | | | | 345/582 |
| 2012/0219233 A1* | 8/2012 | Uro | ........................ | H04N 19/60 |
| | | | | 382/239 |
| 2015/0261571 A1* | 9/2015 | Arun | ..................... | G06T 15/005 |
| | | | | 345/522 |
| 2018/0174273 A1* | 6/2018 | Kamepalli | ................ | G06T 1/20 |

* cited by examiner

*Primary Examiner* — Frank S Chen
(74) *Attorney, Agent, or Firm* — Klarquist Sparkman, LLP

(57) ABSTRACT

Methods and devices for generating hardware compatible compressed textures may include accessing, at runtime of an application program, graphics hardware incompatible compressed textures in a format incompatible with a graphics processing unit (GPU). The methods and devices may include converting the graphics hardware incompatible compressed textures directly into hardware compatible compressed textures usable by the GPU using a trained machine learning model.

20 Claims, 8 Drawing Sheets

MACHINE LEARNING APPLIED TO TEXTURES COMPRESSION OR UPSCALING

RELATED APPLICATION

This application is a Continuation of U.S. application Ser. No. 15/994,464, titled "Machine Learning Applied to Textures Compression or Upscaling", filed May 31, 2018, now U.S. Pat. No. 10,504,248, which claims priority to U.S. Provisional Application No. 62/650,641 titled "Machine Learning Applied to Textures Compression or Upscaling," filed Mar. 30, 2018, both of which are incorporated herein by reference in their entireties.

BACKGROUND

The present disclosure relates to computer devices, graphics processing, and texture compression.

Video games are experiencing problems with textures taking up too much storage space, e.g., hard disk space, optical media space, and/or download size, in order to provide detail at resolutions now used for video games. For example, a video game may take up 100 GB of storage, of which 30-60 GB may be the textures to provide detail at 4K resolutions. There is another problem with the speed with which games can load in textures having a relatively large storage footprint. Games generally use block compression at runtime to save memory, bandwidth, and cache pressure, however, these schemes have a fixed compression ratio. Other schemes present far better compression ratio for the textures but may not be in a format directly usable by the graphics processing unit (GPU). Moreover, there is a desire for an increasing amount of textures with more variations.

Thus, there is a need in the art for improvements in texture compression.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a graphics processing unit (GPU); a memory to store data and instructions including an application and graphics hardware incompatible compressed textures in a format incompatible with the GPU; at least one processor in communication with the memory; and an operating system in communication with the memory, the at least one processor, the GPU, and the application. The application may be operable to access, at runtime of the application, the graphics hardware incompatible compressed textures; and convert the graphics hardware incompatible compressed textures directly into hardware compatible compressed textures usable by the GPU using a trained machine learning model.

Another example implementation relates to a method for generating hardware compatible compressed textures. The method may include accessing, by an application executing on the computer device, at runtime of an application program, graphics hardware incompatible compressed textures in a format incompatible with a graphics processing unit (GPU). The method may include converting the graphics hardware incompatible compressed textures directly into hardware compatible compressed textures usable by the GPU using a trained machine learning model.

Another example implementation relates to computer-readable medium storing instructions executable by a computer device. The computer-readable medium may include at least one instruction for causing the computer device to access, at runtime of an application program, graphics hardware incompatible compressed textures in a format incompatible with a graphics processing unit (GPU). The computer-readable medium may include at least one instruction for causing the computer device to convert the hardware incompatible compressed textures directly into hardware compatible compressed textures usable by the GPU using a trained machine learning model.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
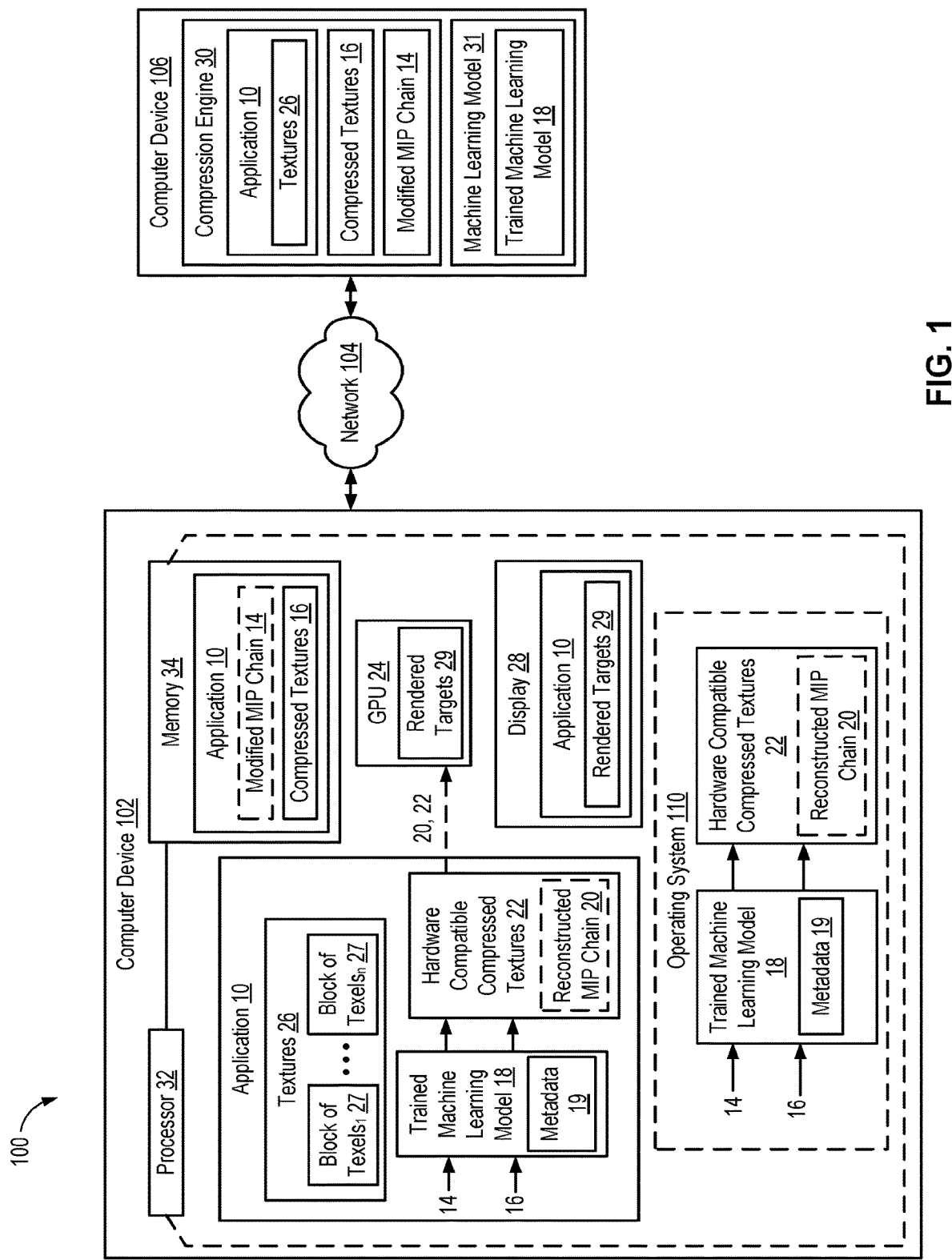
FIG. 1 is a schematic block diagram of an example computer device in accordance with an implementation of the present disclosure.

This disclosure relates to devices and methods for converting between one compression scheme, for example, suitable for loading textures from a hard disk drive (HDD), and a compression scheme suitable for use by the graphics processing unit (GPU), for example, a block compressed format.

Block compression is used by computer games for storing textures, since block compression may be read directly by the GPU, saving memory, bandwidth, and/or cache pressure on a computer device. However, it is possible to achieve higher compression ratios at acceptable image quality using other types of compression, for example, but not limited to, Machine Learning Image Compression, joint photographic experts group (JPEG) compression, wavelet compression, and/or general purpose lossless compression (e.g., zip, lzma, and kraken). Using a compression format with a higher compression ratio on textures for games may be desirable for reducing input/output bandwidth and/or for reducing the size of games on the hard disk, optical media, flash memory or when downloaded over the internet. Unfortunately, these other compressions schemes are not directly usable by the GPU.

The devices and methods may decompress the hardware incompatible compressed textures directly into hardware compatible compressed textures using a trained machine learning model, such as a generative adversarial network (GAN). For example, the trained machine learning model may receive and/or otherwise access the hardware incompatible compressed textures and may use various components of a block compressed textures (e.g., end point and/or indices) to decompress the textures directly into a block compressed texture usable by the GPU. Different machine learning networks and/or trained models may be created for different texture types (e.g., normal map, diffuse, light map, etc.) and different content types (e.g., brick, grass, metal, skin, etc.). These machine learning networks/models may learn based on textures associated with an application as an offline process.

The devices and method may also modify MIP chains used with textures to reduce the size of applications on the hard disk, optical media, or when downloaded over the internet. MIP chains may consists of a plurality of images to use in textures, each of which may be a progressively lower resolution representation of the same image. A MIP chain may be created by repeatedly down-sizing the first image and/or one or more intermediate images in the MIP chains. For example, the first image of a MIP chain may take up majority of the storage space for the MIP chain. The devices and methods may remove the first image and/or one or more intermediate images of the MIP chain and generate modified MIP chains to transmit with the applications in order to reduce input/output bandwidth and/or reduce the size of applications on the hard disk, optical media, or when downloaded over the internet.

The devices and methods may reconstruct the deleted first image and/or any removed intermediate images of the MIP chain, at runtime of the application and/or application installation, using, for example, a trained machine learning model, such as a generative adversarial network (GAN), and generate a hardware compatible compressed reconstructed MIP chain. The trained machine learning model may receive and/or otherwise access the modified MIP chain and may reconstruct the first image and/or any removed intermediate images of the MIP chain by upscaling the top image and/or a next largest intermediate image to recreate the missing image in the modified MIP chain and decompressing the reconstructed MIP chain directly into a hardware compatible compressed reconstructed MIP chain, such as a block compressed MIP chain.

As such, at runtime and/or installation of the application, the devices and methods may quickly convert the GPU-incompatible compressed texture into a format usable by the GPU by using machine learning to decompress the compressed textures directly into a format usable by the GPU. In addition, the devices and methods may quickly reconstruct the first image and/or any removed intermediate images of any modified MIP chains for use with textures in the application. Thus, based on the present disclosure, textures may be compressed using a higher compression ratio compression algorithms (relative to GPU-compatible compression algorithms) for storage and/or transmission, and decompressed directly into a format usable by the GPU. Decompressing the GPU incompatible texture may result in a compressed GPU compatible texture.

Referring now to FIGS. 1-4, an example system 100 for use in connection with texture compression and/or upscaling may include a computer device 102 that may include a graphics-based application 10 having textures 26, such as, but not limited to, a game, that may be run by processor 32 and/or operating system 110 of the computer device 102. For example, application 10 may be accessed by computer device 102 from the hard disk, optical media, and/or downloaded over the internet.

Application 10 may include one or more textures 26 included in one or more scenes or images associated with scenes of application 10. Textures 26 may provide information about an image rendered in the application 10. For example, textures 26 may include a bitmap of pixel colors that give an object the appearance of texture. Textures 26 may be used by game developers to create realism in applications 10 by providing detailed surfaces and/or colors. For example, textures 26 may be used to make a concrete barrier in a scene of application 10 look realistic. Another example may include a plurality of textures 26 being layered to make a player's skin look realistic. For example, the texture 26 may include one or more texture layers, such as one texture layer that may include veins to include in the skin, while another texture layer emulates light absorption on the skin, and another texture layer may be used to emulate sweat on the player's skin. Another example may include using a variety of textures 26 to make grass in the scene look realistic. As such, variations of textures 26 may be used by game developers to make scenes of an application 10 look realistic. Textures 26 may include blocks of texels 27 (up to m, where m is an integer). For example, the blocks of texels 27 may be, but not limited to, a 4×4, 8×4, 4×8, and/or an 8×8 block of texels 27. Each texels may be a pixel in the texture 26 and may also be the smallest unit of a texture that can be read or written to. In addition, each block of texels 27 may specify a mode, featuring 1 to 4 related components, such as, a shape, a number of endpoints, and indices indicating how to interpolate between the endpoints per texel. For instance, in one implementation that should not be construed as limiting, an example block of texels 27 may be 1 of 8 modes, each with up to 32 shapes, each with 2 to 4 endpoints, and with different number of bits awarded to the index for each texel. As such, these components define a search space for determining a manner in which to compress the texture 26.

Application 10 may also include one or more modified MIP chains 14 and/or compressed textures 16 so that when application 10 is transmitted to computer device 102 and/or stored in memory 34, the size of application 10 is greatly reduced, and thus, reducing input/output bandwidth and/or the size of application 10 on the hard disk, optical media, flash memory, and/or downloaded over the internet. For example, the compressed textures 16 may be compressed using any one of a plurality of compression algorithms or schemes that are incompatible with the GPU, but which provide a substantially greater compression ratio as compared to a GPU-compatible compression algorithm/scheme (e.g., block compression). For example, the compressed textures 16 may be compressed using machine learning image compression, JPEG, wavelet, general purpose lossless compression, and/or other forms of compression that result in a relatively high compression ratio. As noted, however, the compressed textures 16 may not be directly usable by the GPU.

Figure 2A:
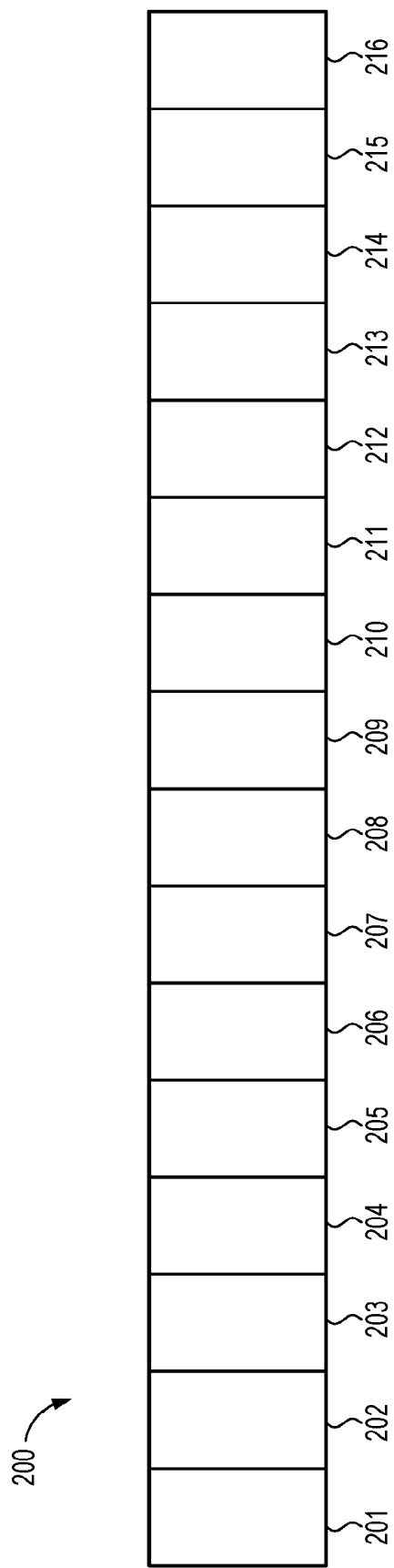
FIG. 2A is an example of a MIP chain for use with textures in accordance with an implementation of the present disclosure.

Referring now to FIG. 2A, illustrated is an example MIP chain 200 may be used as a texture 26 of application 10 to increase rendering speed and image quality in a scene and/or images of application 10. MIP chain 200 may include a plurality of images 201-216 to be used with textures, each of which may be a progressively lower resolution representation of the same image. A lower resolution image may be used from MIP chain 200 for objects in the scene and/or image that may not need a high level of detail, while a higher resolution image may be used from MIP chain 200 for objects in the scene and/or image that may need a high level of detail. MIP chain 200 may be created by repeatedly down-sizing the first image 201. Each image 201-216 may correspond to a different level in the MIP chain 200. In the illustrated example, MIP chain 200 may include sixteen levels with each level having a corresponding image 201-216. The resolution of the first image 201 may be the highest resolution compared to the resolutions of the images further down the MIP chain 200. In addition, the first image 201 consume majority of the storage space for the MIP chain 200 (e.g., 75% of the storage space).

Figure 2B:
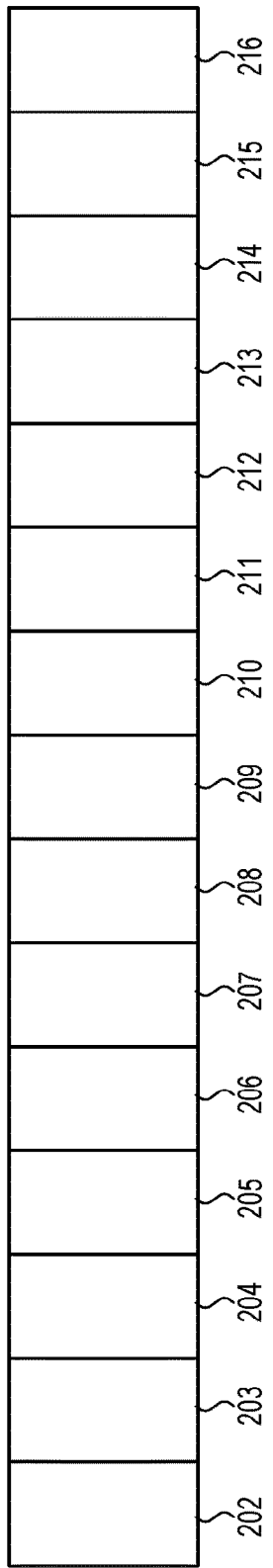
FIG. 2B is an example of a modified MIP chain removing a first image of a MIP chain for use with textures in accordance with an implementation of the present disclosure.

Referring now to FIG. 2B, illustrated is an example modified MIP chain 14 that may be transmitted with application 10 removing a first image of a MIP chain. Modified MIP chain 14 may not include the first image 201 (FIG. 2A) of MIP chain 200 (FIG. 2A). Thus, instead of containing sixteen levels of images, modified MIP chain 14 may only include fifteen levels with each level having a corresponding image 202-216. The images 202-216 included in the modified MIP chain 14 may correspond to the images 202-216 in MIP chain 200 (FIG. 2A). As such, modified MIP chain 14 may provide a significant reduction in storage space by removing the highest resolution image (e.g., the first image 201) from the MIP chain 200.

Figure 2C:
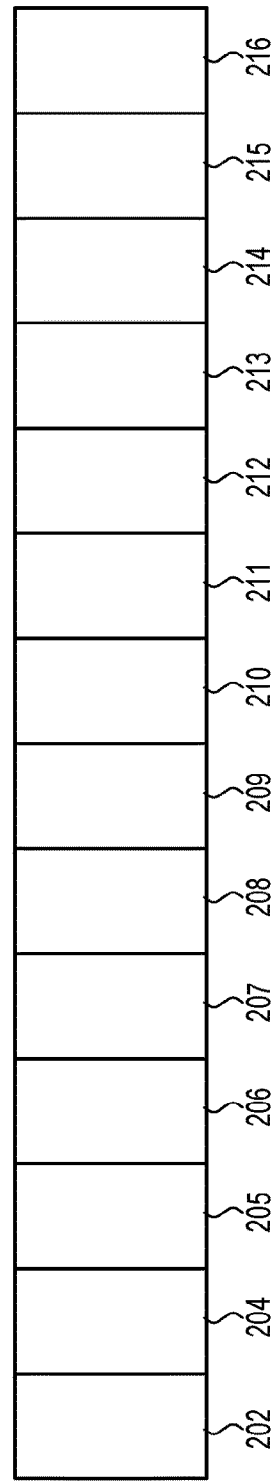
FIG. 2C is an example of a modified MIP chain removing a first image of a MIP chain along with an intermediate image of a MIP chain for use with textures in accordance with an implementation of the present disclosure.

Referring now to FIG. 2C, illustrated is an example modified MIP chain 14 that may be transmitted with application 10 removing a first image of a MIP chain along with an intermediate image of a MIP chain. Modified MIP chain 14 may not include the first image 201 (FIG. 2A) and the third image 203 (FIG. 2A) of MIP chain 200 (FIG. 2A). Thus, instead of containing sixteen levels of images, modified MIP chain 14 may only include fourteen levels with each level having a corresponding image 202, 204-216. The images 202, 204-216 included in the modified MIP chain 14 may correspond to the images 202, 204-216 in MIP chain 200 (FIG. 2A). As such, modified MIP chain 14 may provide a significant reduction in storage space by removing the highest resolution image (e.g., the first image 201) along with one or more intermediate images (e.g., the third image 203) from MIP chain 200.

Referring back to FIG. 1, in an implementation, the devices and methods may generate the compressed textures 16 and/or modified MIP chains 14 offline using one or more computer devices 106. Computer device 106 may include a compression engine 30 that receives the textures 26 for the applications 10. Compression engine 30 may compress the textures 26 into compressed textures 16. For example, compression engine 30 may use one or more of a plurality of forms/techniques/algorithms of compression, using GPU-incompatible formatting, and compare the results in order to identify a form of compression that results in a highest compression ratio including, but not limited to, machine learning image compression, JPEG, wavelet, general purpose lossless compression, and/or any combination of these compression techniques. Compression engine 30 may also generate modified MIP chains 14 by removing the first image 201 (FIG. 2A) and/or one or more intermediate images in MIP chain 200 (FIG. 2A).

Computer device 106 may also include a machine learning model 31 that may use one or more machine learning networks to generate a trained machine learning model 18. The trained machine learning model 18 may decompress at runtime of application 10 and/or installation of application 10 the compressed textures 16 and/or the modified MIP chains 14 directly into hardware compatible compressed textures 22 and/or hardware compatible compressed reconstructed MIP chains 20 usable by the GPU.

Figure 3:
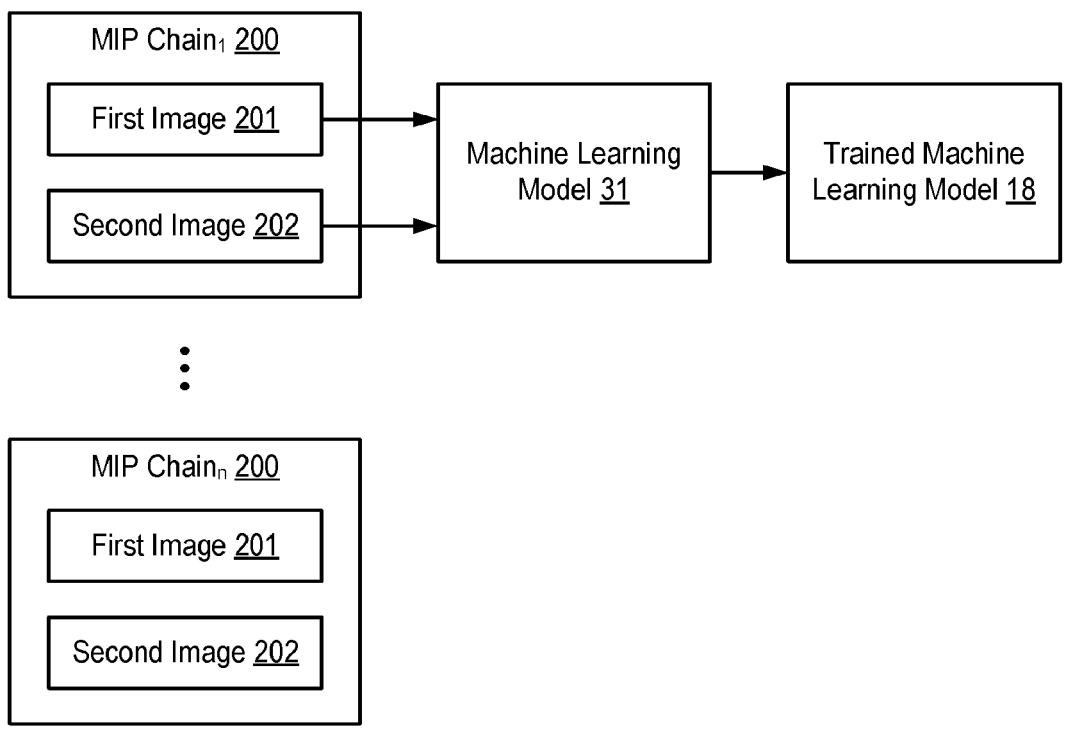
FIG. 3 is an example of training a machine learning model to upscale an image in accordance with an implementation of the present disclosure.

Referring now to FIG. 3, illustrated is an example of using machine learning model 31 to generate a trained machine learning model 18 for decompressing the modified MIP chains 14 (FIG. 1) into a hardware compatible compressed reconstructed MIP chain 20 (FIG. 1) using, for example, computer device 106 (FIG. 1). The first image 201 and the second image 202 of a plurality of MIP chains 200 (e.g., up to n MIP chains 200, where n is an integer) may be inputted into machine learning model 31. For example, the first image 201 and the second image 202 of the MIP chains 200 may be from a particular application, from a subset of applications, from all games, and/or from a specific type of texture used in an application. The lower resolution images (e.g., the second images 202) and the higher resolution images (e.g., the first images 201) may be used to train the machine learning model to understand how to take a lower resolution image (e.g., the first image 201) and upscale the lower resolution image to a higher resolution image so that the first image 201 may be recreated without the need to transmit the first image 201 image in the MIP chain. By using images that are a single level apart during the training phase (e.g., the first image 201 and the second image 202), data may be preserved in the reconstructed images and artifacts in the reconstructed images may be reduced.

Machine learning model 31 may use machine learning networks, such as, but not limited to, convolutional neural networks and generative adversarial networks (GANs) to generate the trained machine learning model 18 using the lower resolution images (e.g., the second images 202) and the higher resolution images (e.g., the first images 201). During the training process, the machine learning networks may be used to reduce artifacts in the up scaled and/or up res images so that the reconstructed images may be as close as possible to the original images included in the MIP chain. The machine learning networks may evaluate the image and visual quality of the reconstructed images during the training process to determine the amount of quality loss in the reconstructed images as compared to the original first images 201 of the MIP chain 200. For example, the machine learning networks may use the signal to noise ratio and/or measurements of the image to assess the image and visual quality of the reconstructed images. As such, the trained machine learning model 18 may upscale a lower resolution image (e.g., the second image 202 of MIP chain 200) into a higher resolution image with minimal image artifacts in the reconstructed image.

By generating a trained machine learning model 18 to recreate the higher resolution images from a lower resolution image, a significant storage savings may occur in the amount of data being transmitted with the textures. For example, the first image 201 of the MIP chain 200 may consist of 75% of the storage space for the MIP chain 200. As such, disk space and/or the amount of data downloaded may be significantly reduced if the first image 201 is removed from the MIP chain 200.

In addition, the trained machine learning model 18 may generate a hardware compatible compressed reconstructed MIP chain 20 (FIG. 1) directly usable by the GPU. In an implementation, the hardware compatible compressed reconstructed MIP chain 20 may include the compressed reconstructed first image and/or any reconstructed intermediate images along with the plurality of other images compressed. For example, hardware compatible compressed reconstructed MIP chain 20 may include a plurality of block compressed images.

Figure 4:
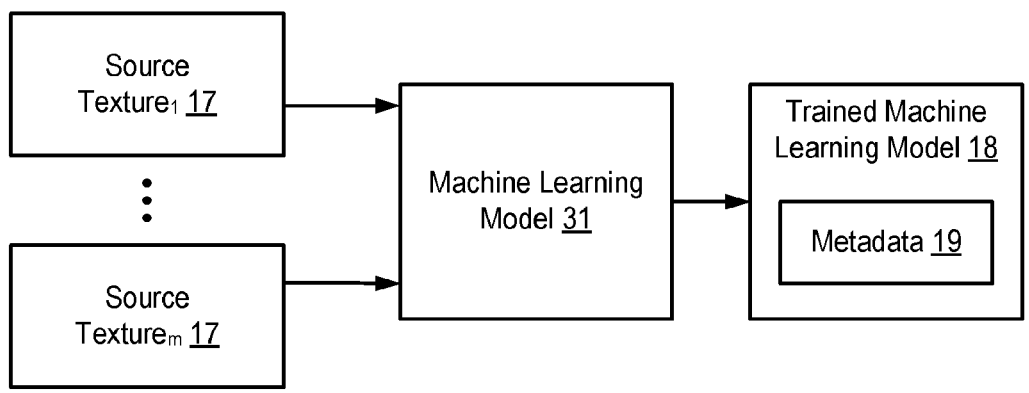
FIG. 4 is an example of training a machine learning model to decompress compressed textures in accordance with an implementation of the present disclosure.

Referring now to FIG. 4, illustrated is an example of using machine learning model 31 to generate a trained machine learning model 18 for decompressing hardware incompatible compressed textures 16 directly into hardware compatible compressed textures 22 (FIG. 1) using, for example, computer device 106 (FIG. 1). In an implementation, a plurality of source textures 17 (up to m, where m is an integer) may be inputted into machine learning model 31. The plurality of source textures 17 may include textures from a particular application and/or textures from all applications. For example, a single application may include 30,000 to 40,000 textures. Moreover, specific types of textures may be used to train the model. For example, source textures 17 for normal maps, albedo maps, material information, including identification (ID)'s, roughness, specular power, and/or blend maps for terrain may be input into machine learning model 31. Another example may include source textures 17 for textures containing global illumination properties, such as, light maps, light probes, radiosity normal maps, sky domes, and/or atmospheric simulation may be input into machine learning model 31. Another example may include source textures 17 sparsely populated or texture atlas's, where textures for multiple different surfaces are packed into a single map inputted into machine learning model 31. Another example may include source textures 17 for certain types of material, such as, but not limited to, metals, wood, bark, vegetation, rock, brick, concrete, tarmac, car bodies, tires, skin, eyes, hair, clothing, and/or armor (plate, chain mail etc.). Another example may include source textures 17 for specific effects, such as, fire, smoke, explosions, and/or magic may be inputted into machine learning model 31. Another example may include source textures 17 for user interfaces and/or fonts may be inputted into machine learning model 31.

As such, the machine learning model may be trained on a curve for a specific type of texture and/or trained for textures in a specific application. In addition, the machine learning model may have a more general training based on all textures from different applications.

Machine learning model 31 may use adversarial machine learning networks, such as, but not limited to, convolutional neural networks and generative adversarial networks (GANs) to generate the trained machine learning model 18. In an implementation, custom adversarial machine learning networks and/or codecs may be provided for textures used in applications. Various components of the block compressed textures (e.g., shapes, modes, end points and/or indices) may be used by the machine learning networks during the training so that the trained machine learning model 18 may decompress the hardware incompatible compressed textures 16 directly into hardware compatible compressed textures.

For example, the trained machine learning model 18 may decompress the identified textures 17 into block compressed textures usable by the GPU by predicting the components of a blocked compressed texture (e.g., the modes, shapes, endpoints, and/or indices) for the identified textures 17 and/or a region of the texture 17. The predicted block compressed textures may select various modes, shapes, and/or endpoints to use during the block compression for the identified textures 17 and/or a region of the texture 17.

The machine learning networks may evaluate the image and visual quality of the predicted blocked compressed textures generated during the training process by comparing the predicted block compressed textures to the original source textures 17 used as input for the training. The machine learning networks may try to improve the predicted block compressed textures (e.g., modifying the selected modes, shapes, and/or endpoints) until there is a minimal difference between the predicted block compressed textures and the original source textures 17. When a minimal difference occurs between the predicted block compressed textures and the original source textures 17, it may be difficult to distinguish the predicted block compressed textures and the original source textures 17.

The selected modes, shapes and/or endpoints used when predicting the blocked compressed textures may be saved as metadata 19. Metadata 19 may provide guidance as to which modes, shapes, and/or end points may produce the best quality blocks. As such, metadata 19 may be used by the trained machine learning model 18 to create hardware compatible compressed textures 22 that closely resemble the original raw images of application 10. For example, metadata 19 may be used by the trained machine learning model 18 to assist in selecting correct endpoints, modes, and/or shapes of a block compressed texture when decompressing the hardware incompatible compressed textures 16 directly into block compressed number (BCN) textures.

Referring back to FIG. 1, computer device 102 may download an application 10 with the modified MIP chains 14 and/or compressed textures 16 from computer device 106 via, for example, a wired and/or wireless network 104. Network 104 may also include optical media, a hard disk, flash memory or any other type of storage. In another implementation, the modified MIP chains 14 and/or compressed textures 16 may be saved on optical media, flash memory or the hard disk.

Computer device 102 may include an operating system 110 executed by processor 32 and/or memory 34. Memory 34 of computer device 102 may be configured for storing data and/or computer-executable instructions defining and/or associated with operating system 110, and processor 32 may execute such data and/or instructions to instantiate operating system 110. An example of memory 34 can include, but is not limited to, a type of memory usable by a computer, such as random access memory (RAM), read only memory (ROM), tapes, magnetic discs, optical discs, volatile memory, non-volatile memory, and any combination thereof. An example of processor 32 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Operating system 110 and/or application 10 may include the trained machine learning model 18 that may receive and/or otherwise access the modified MIP chains 14 and/or compressed textures 16. The trained machine learning model 18 may decompress at runtime of application 10 and/or installation of application 10 the compressed textures 16 and/or the modified MIP chains 14 directly into hardware compatible compressed textures 22 and/or hardware compatible compressed reconstructed MIP chains 20 usable by the GPU and/or CPU in real time quickly and easily.

The trained machine learning model 18 may use metadata 19 to create hardware compatible compressed textures 22 that closely resemble the original raw images of application 10. Metadata 19 may provide guidance as to which modes, shapes, and/or end points may produce the best quality blocks. For example, the trained machine learning model 18 may use metadata 19 to assist in selecting correct endpoints, modes, and/or shapes of a block compressed texture when decompressing the hardware incompatible compressed textures 16 directly into BCN textures. As such, the hardware incompatible compressed textures 16 may be decompressed directly into hardware compatible compressed textures 22 usable by the GPU using the trained machine learning model 18.

The trained machine learning model 18 may be executed using GPU 24 at a runtime of application 10 and/or an installation of application 10. GPU 24 may be a dedicated graphics card on computer device 102 for use with application 10. For example, GPU 24 may receive and/or otherwise access the hardware incompatible compressed textures 16 and may execute the trained machine learning model 18 to directly decompress the hardware incompatible compressed textures 16 into the hardware compatible compressed textures 22. In addition, application 10 may discard the hardware incompatible compressed textures 16 after the conversion has taken place.

In an implementation, the trained machine learning model 18 may be executed in a system that includes both an integrated GPU and a discrete GPU. For example, the trained machine learning model 18 may be executed by an integrated GPU of a central processing unit (CPU) on computer device 102 so that resources of the discrete GPU 24 may not be used for generating the hardware compatible compressed textures 22. Application 10 may discard the hardware incompatible compressed textures 16 after the conversion has taken place.

In another implementation, the trained machine learning model 18 may be executed by the CPU. As such, the CPU may receive and/or otherwise access the hardware incompatible compressed textures 16 and the CPU may run the trained machine learning model 18 to directly create the hardware compatible compressed textures 22. Application 10 may discard the hardware incompatible compressed textures 16 after the conversion has taken place.

The hardware compatible compressed textures 22 and/or the hardware compatible compressed reconstructed MIP chains 20 may be transmitted to GPU 24 for rendering. For example, the CPU, the GPU and/or a direct memory access (DMA) device may transmit the hardware compatible compressed textures 22 and/or the hardware compatible compressed reconstructed MIP chains 20 to GPU 24 for rendering. GPU 24 may render the hardware compatible compressed textures 22 into one or more rendered targets 29 for presentation on display 28 for application 10. As such, as a user plays application 10 and moves from one scene to another scene of application 10, the rendered targets 29 presented on display 28 may be updated.

Figure 5:
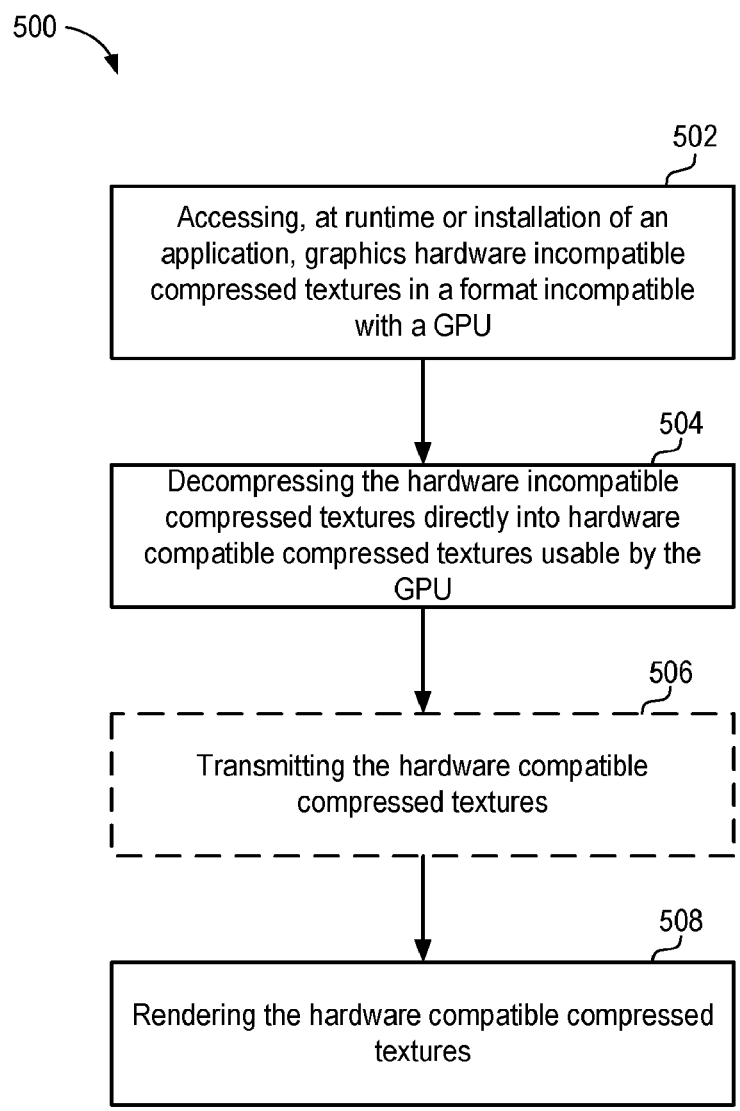
FIG. 5 is an example method flow for generating hardware compatible compressed textures using machine learning in accordance with an implementation.

Referring now to FIG. 5, a method flow 500 for generating hardware compatible compressed textures using machine learning for use with an application 10 (FIG. 1), by computer device 102 (FIG. 1) is discussed in connection with the description of the architecture of FIGS. 1-4.

At 502, method 500 may include accessing, at runtime or installation of an application, graphics hardware incompatible compressed textures in a format incompatible with a GPU. Computer device 102 may download an application 10 with the modified MIP chains 14 and/or hardware incompatible compressed textures 16 from computer device 106 via, for example, network 104. In another implementation, the modified MIP chains 14 and/or the hardware incompatible compressed textures 16 may be saved on optical media, flash memory or the hard disk.

The modified MIP chains 14 may not include the highest resolution image (e.g., the first image 201 of the MIP chain 200) and/or one or more intermediate images (e.g., the third image 203 of the MIP chain 200). The resolution of the first image 201 may be the highest resolution compared to the resolutions of the images further down the MIP chain 200. For example, the first image 201 may consume majority of the storage space for the MIP chain 200 (e.g., 75% of the storage space). As such, modified MIP chain 14 may provide a significant reduction in storage space by removing the highest resolution image (e.g., the first image 201) and/or one or more intermediate images from the MIP chain 200.

The compressed textures 16 may be compressed using any one of a plurality of compression algorithms or schemes that are incompatible with the GPU, but which provide a substantially greater compression ratio as compared to a GPU-compatible compression algorithm/scheme (e.g., block compression). For example, the compressed textures 16 may be compressed using machine learning image compression, JPEG, wavelet, and/or other forms of compression that result in a relatively high compression ratio. As noted, however, the compressed textures 16 may not be directly usable by the GPU.

At 504, method 500 may include decompressing the hardware incompatible compressed textures directly into hardware compatible compressed textures usable by the GPU. The trained machine learning model 18 may receive and/or otherwise access the modified MIP chains 14 and/or the hardware incompatible compressed textures 16 and may decompress the hardware incompatible compressed textures 16 and/or the modified MIP chains 14 directly into hardware compatible compressed textures 22 for use with application 10. For example, the trained machine learning model 18 may decompress the compressed textures 16 directly into block compressed textures usable by the GPU.

The trained machine learning model 18 may use metadata 19 to create hardware compatible compressed textures 22 that closely resemble the original raw images of application 10. Metadata 19 may provide guidance as to which modes, shapes, and/or end points may produce the best quality blocks. For example, the trained machine learning model 18 may use metadata 19 to assist in selecting correct endpoints, modes, and/or shapes of a block compressed texture when decompressing the hardware incompatible compressed textures 16 directly into BCN textures.

In addition, the trained machine learning model 18 may upscale a lower resolution image (e.g., the first image 202 of the modified MIP chain 14 and/or a next largest intermediate image in the modified MIP chain 14) to recreate the missing image with minimal image artifacts in the reconstructed image and generate a hardware compatible compressed reconstructed MIP chain 20.

In one example use case, the modified MIP chain 14 may transmit a 512×512 second image 202 (FIG. 2C), a 128×128 fourth image 204 (FIG. 2C), a 64×64 fifth image 205 (FIG. 2C), a 32×32 sixth image 206 (FIG. 2C), and a 16×16 seventh image (FIG. 2C). The trained machine learning model 18 may upscale the 512×512 second image 202 into a 1024×1024 first image. In addition, the trained machine learning model 18 may upscale the 128×128 fourth image 204 into a 256×256 third image. In addition, the trained machine learning model 18 may generate a hardware compatible compressed reconstructed MIP chain 20 that includes compressed versions of the 1024×1024 first image, the 512×512 second image 202, the 256×256 third image, the 128×128 fourth image 204, the 64×64 fifth image, a 32×32 sixth image, and a 16×16 seventh image.

As such, the hardware compatible compressed reconstructed MIP chain 20 may include the compressed reconstructed first image along with the plurality of other images compressed. In an implementation, hardware compatible compressed reconstructed MIP chain 20 may be a plurality of block compressed images. Thus, the hardware compatible compressed reconstructed MIP chain 20 may be directly usage by the GPU.

The trained machine learning model 18 may be executed using GPU 24 at a runtime of application 10 and/or an installation of application 10. In an implementation, GPU 24 may receive and/or otherwise access the hardware incompatible compressed textures 16. GPU 24 may execute the trained machine learning model 18 to directly decompress the hardware incompatible compressed textures 16 into the hardware compatible compressed textures 22. Application 10 may discard the hardware incompatible compressed textures 16 after the conversion has taken place. GPU 24 may be a dedicated graphics card on computer device 102 for use with applications 10.

In an implementation, the trained machine learning model 18 may be executed in a system that includes both an integrated GPU and a discrete GPU. For example, the trained machine learning model 18 may be executed by an integrated GPU of a CPU on computer device 102 so that resources of the discrete GPU 24 may not be used for generating the hardware compatible compressed textures 22. Application 10 may discard the hardware incompatible compressed textures 16 after the conversion has taken place.

In another implementation, the trained machine learning model 18 may be executed by the CPU. As such, the CPU may receive and/or otherwise access the hardware incompatible compressed textures 16 and the CPU may run the trained machine learning model 18 to directly create the hardware compatible compressed textures 22. Application 10 may discard the hardware incompatible compressed textures 16 after the conversion has taken place.

At 506, method 500 may optionally include transmitting the hardware compatible compressed textures. The hardware compatible compressed textures may be transmitted to the GPU. For example, the CPU, the GPU, and/or a direct memory access (DMA) device may transmit the hardware compatible compressed textures 22 and/or the hardware compatible compressed reconstructed MIP chains 20 to GPU 24 for rendering.

At 508, method 500 may include rendering the hardware compatible compressed textures. The hardware compatible compressed textures 22 and/or the hardware compatible compressed reconstructed MIP chains 20 may be rendered by GPU 24. GPU 24 may render the hardware compatible compressed textures 22 into one or more render targets 29 and may transmit the one or more render targets 29 for presentation on display 28 for application 10. As such, as a user plays application 10 and moves from one scene to another scene of application 10, the textures 26 presented on display 28 may be updated.

Figure 6:
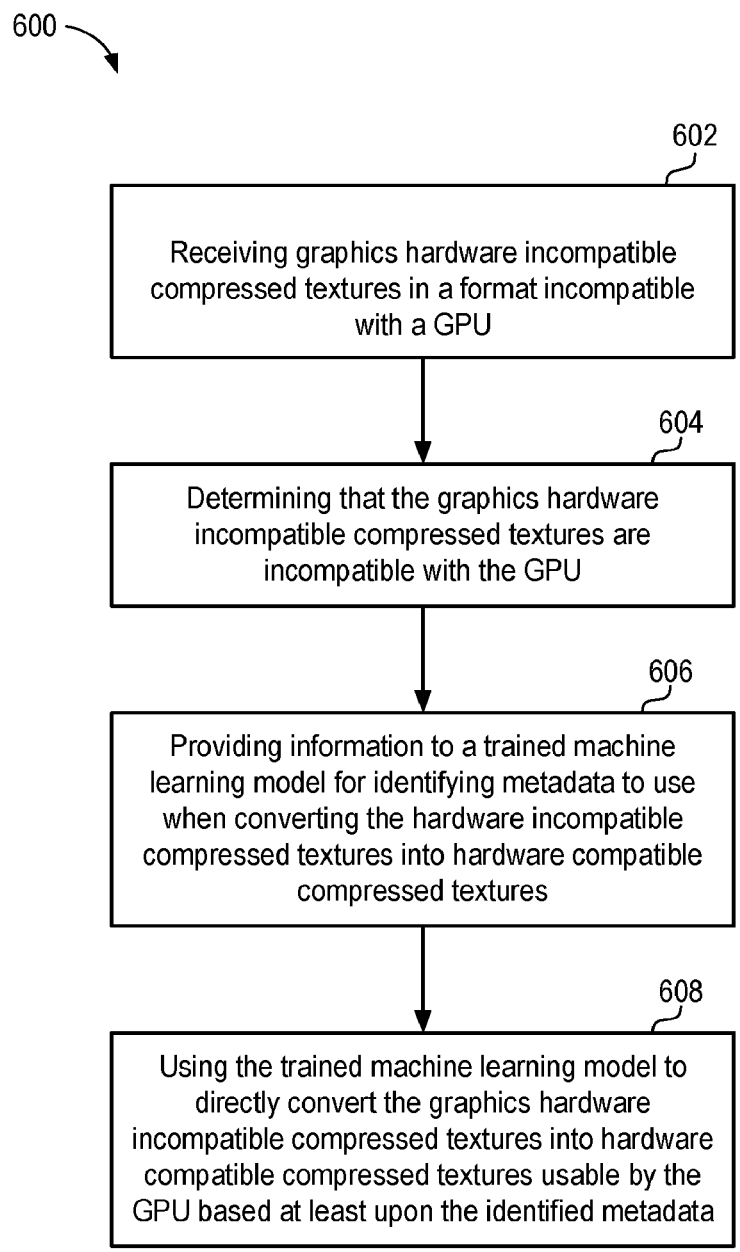
FIG. 6 is an example method flow for generating hardware compatible compressed textures using machine learning in accordance with an implementation.

Referring now to FIG. 6, a method flow 600 for generating hardware compatible compressed textures using machine learning for use with an application 10 (FIG. 1), by computer device 102 (FIG. 1) is discussed in connection with the description of the architecture of FIGS. 1-4. In addition, method flow 600 may be used in connection with method flow 500 (FIG. 5).

At 602, method 600 may include receiving graphics hardware incompatible compressed textures in a format incompatible with a GPU. Computer device 102 may download an application 10 with the modified MIP chains 14 and/or hardware incompatible compressed textures 16 from computer device 106 via, for example, network 104. In another implementation, the modified MIP chains 14 and/or the hardware incompatible compressed textures 16 may be saved on optical media, flash memory or the hard disk. For example, application 10 may receive and/or otherwise access the hardware incompatible compressed textures 16 and/or the modified MIP chains 14. In an implementation, GPU 24 may receive and/or otherwise access the hardware incompatible compressed textures 16 and/or the modified MIP chains 14. In another implementation, the CPU may receive and/or otherwise access the hardware incompatible compressed textures 16 and/or the modified MIP chains 14.

At 604, method 600 may include determining that the graphics hardware incompatible compressed textures are incompatible with the GPU. Application 10 may identify a format of the graphics hardware incompatible compressed textures 16. For example, the graphics hardware incompatible compressed textures 16 may be compressed using one or more of a plurality of forms/techniques/algorithms of compression that results in a high compression ratio including, but not limited to, machine learning image compression, JPEG, wavelet, general purpose lossless compression, and/or any combination of these compression techniques. In an implementation, GPU 24 and/or the CPU may identify a format of the graphics hardware incompatible compressed textures 16.

Application 10, GPU 24, and/or the CPU may compare the identified format with information regarding a hardware compatible format for the GPU 24. When a match does not occur between the identified format for the graphics hardware incompatible compressed textures 16 and the hardware compatible format for the GPU 24, application 10, GPU 24 and/or the CPU may determine that the graphics hardware incompatible compressed textures 16 are incompatible with the GPU 24. For example, application 10 may receive information that GPU 24 operates on BCN textures. Application 10 may determine that the format of the graphics hardware incompatible compressed textures 16 is different from the GPU 24 compatible format (e.g., the graphics hardware incompatible compressed textures 16 are not BCN textures). As such, application 10, GPU 24, and/or the CPU may notify the trained machine learning model 18 that the graphics hardware incompatible compressed textures 16 are in a format incompatible with GPU 24.

At 606, method 600 may include providing information to a trained machine learning model for identifying metadata to use when converting the hardware incompatible compressed textures into hardware compatible compressed textures. For example, application 10, GPU 24, and/or the CPU may provide information to the trained machine learning model 18 that may be used for identifying metadata 19 to use when converting the hardware incompatible compressed textures 16 into hardware compatible compressed textures 22. For example, the information may identify a format of the graphics hardware incompatible compressed textures 16. The information may also include the hardware compatible format for GPU 24. For example, application 10 may notify the trained machine learning model 18 that the GPU 24 uses block compressed formats.

In addition, the information may also include the type of textures included in the hardware incompatible compressed textures. Different metadata may be selected by the trained machine learning model 18 based at least upon a type of texture being used and/or the application in use. For example, metadata selected for materials textures (e.g., vegetation, metals, wood, rock, brick, concrete, etc.) may differ from the metadata selected for specific effects textures (e.g., fire, smoke, explosions and/or magic).

As such, the trained machine learning model 18 may use the information received to determine what metadata 19 to use when converting the graphics hardware incompatible compressed textures 16 into hardware compatible compressed textures 22. Metadata 19 may be for an identified texture 26 and/or a region of a texture 26. As such, the same metadata 19 may be used for entire areas of the texture 26.

At 608, method 600 may include using the trained machine learning model to directly convert the graphics hardware incompatible compressed textures into hardware compatible compressed textures usable by the GPU based at least upon the identified metadata. The trained machine learning model 18 may be executed by application 10, GPU 24, and/or the CPU. The trained machine learning model 18 may receive and/or otherwise access the modified MIP chains 14 and/or the graphics hardware incompatible compressed textures 16.

The trained machine learning model 18 may use the identified metadata 19 to create hardware compatible compressed textures 22 that closely resemble the original raw images of application 10. Metadata 19 may provide guidance as to which modes, shapes, and/or end points may produce the best quality blocks for the identified texture 26 and/or a sub region of the texture 26. The trained machine learning model 18 may use metadata 19 to assist in selecting correct endpoints, modes, and/or shapes of a block compressed texture when decompressing the graphics hardware incompatible compressed textures 16 directly into BCN textures. For example, metadata 19 may indicate for an identified texture that only modes 1 and 2 of 8 different modes may be used by the trained machine learning model 18 when selecting the modes of a block compressed texture for the identified texture.

In addition, the trained machine learning model 18 may upscale a lower resolution image (e.g., the first image 202 of the modified MIP chain 14 and/or a next largest intermediate image in the modified MIP chain 14) to recreate the missing image with minimal image artifacts in the reconstructed image and generate a hardware compatible compressed reconstructed MIP chain 20. The trained machine learning model 18 may use the identified metadata 19 to assist in generating the hardware compatible compressed reconstructed MIP chain 20. For example, metadata 19 may provide guidance as to as to which modes, shapes, and/or end points may produce the best quality blocks for the identified texture 26 and/or a sub region of the texture 26.

By using metadata 19 when converting the graphics hardware incompatible compressed textures 16 directly into hardware compatible compressed textures 22, the trained machine learning model 18 may determine a best output for the hardware compatible compressed textures 22. Moreover, there may be a minimal difference between the hardware compatible compressed textures 22 and the original source images. As such, it may be difficult to distinguish the hardware compatible compressed textures 22 as compared to the original source images (e.g., there may be minimal image artifacts in the hardware compatible compressed textures 22). Thus, metadata 19 may improve the quality of the hardware compatible compressed textures 22 and/or may speed up the conversion from the graphics hardware incompatible compressed textures 16 into hardware compatible compressed textures 22.

Figure 7:
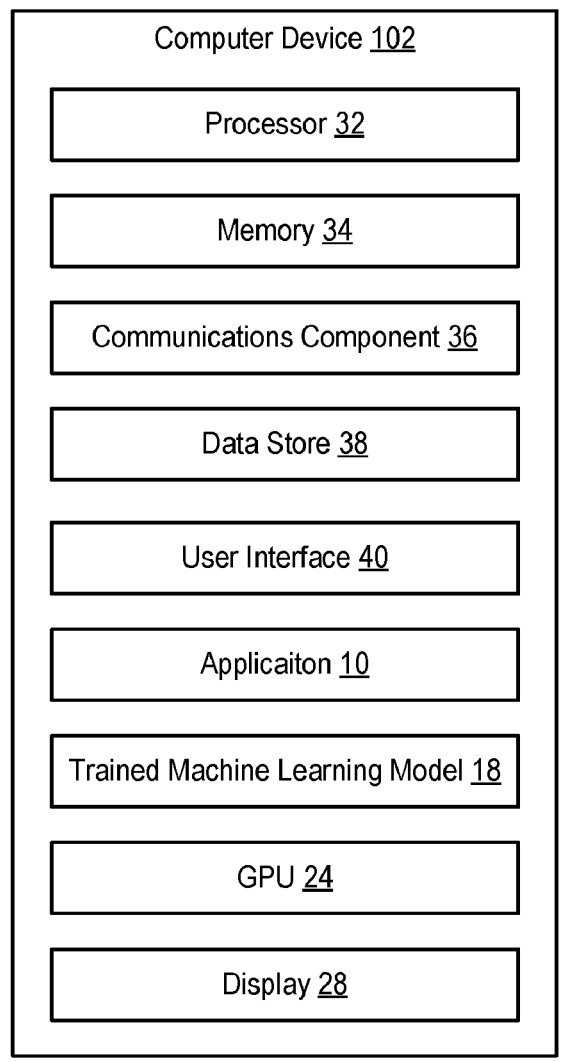
FIG. 7 is a schematic block diagram of an example device in accordance with an implementation of the present disclosure.

Referring now to FIG. 7, illustrated is an example computer device 102 in accordance with an implementation, including additional component details as compared to FIG. 1. In one example, computer device 102 may include processor 32 for carrying out processing functions associated with one or more of components and functions described herein. Processor 32 can include a single or multiple set of processors or multi-core processors. Moreover, processor 32 can be implemented as an integrated processing system and/or a distributed processing system.

Computer device 102 may further include memory 34, such as for storing local versions of applications being executed by processor 32. Memory 34 can include a type of memory usable by a computer, such as random access memory (RAM), read only memory (ROM), tapes, magnetic discs, optical discs, volatile memory, non-volatile memory, and any combination thereof. Additionally, processor 32 and memory 34 may include and execute operating system 110 (FIG. 1).

Further, computer device 102 may include a communications component 36 that provides for establishing and maintaining communications with one or more parties utilizing hardware, software, and services as described herein. Communications component 36 may carry communications between components on computer device 102, as well as between computer device 102 and external devices, such as devices located across a communications network and/or devices serially or locally connected to computer device 102. For example, communications component 36 may include one or more buses, and may further include transmit chain components and receive chain components associated with a transmitter and receiver, respectively, operable for interfacing with external devices.

Additionally, computer device 102 may include a data store 38, which can be any suitable combination of hardware and/or software, that provides for mass storage of information, databases, and programs employed in connection with implementations described herein. For example, data store 38 may be a data repository for applications 10 (FIG. 1), trained machine learning model 18 (FIG. 1), GPU 24 (FIG. 1), and/or display 28 (FIG. 1).

Computer device 102 may also include a user interface component 40 operable to receive inputs from a user of computer device 102 and further operable to generate outputs for presentation to the user. User interface component 40 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 40 may include one or more output devices, including but not limited to a display, a speaker, a haptic feedback mechanism, a printer, any other mechanism capable of presenting an output to a user, or any combination thereof.

In an implementation, user interface component 40 may transmit and/or receive messages corresponding to the operation of applications 10, trained machine learning model 18, GPU 24, and/or display 28. In addition, processor 32 executes applications 10, trained machine learning model 18, GPU 24, and/or display 28, and memory 34 or data store 38 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, flash memory, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
   a graphics processing unit (GPU);
   a memory to store data and instructions including an application and graphics hardware incompatible compressed textures in a format incompatible with the GPU;
   at least one processor in communication with the memory;

an operating system in communication with the memory, the at least one processor, the GPU, and the application, wherein the application is operable to:
- receive the graphics hardware incompatible compressed textures;
- provide information to a trained machine learning model for identifying metadata to use during a conversion of the hardware incompatible compressed textures into hardware compatible compressed textures; and
- convert the graphics hardware incompatible compressed textures into hardware compatible compressed textures usable by the GPU using the trained machine learning model and the identified metadata.

2. The computer device of claim 1, wherein the machine learning model uses the metadata to select configurations for a block compression of the graphics hardware incompatible compressed textures.

3. The computer device of claim 2, wherein the configurations for the block compression produce hardware compatible compressed textures with minimum image artifacts compared to original source images.

4. The computer device of claim 1, wherein the information identifies a format of the graphics hardware incompatible compressed textures and the machine learning model selects the metadata in response to the format.

5. The computer device of claim 1, wherein the information identifies a hardware compatible format for the GPU and the machine learning model selects the metadata in response to the hardware compatible format for the GPU.

6. The computer device of claim 1, wherein the information identifies a type of texture included in the hardware incompatible compressed textures and the machine learning model selects the metadata in response to the type of texture.

7. The computer device of claim 1, wherein the metadata is for an identified texture of the graphics hardware incompatible compressed textures.

8. The computer device of claim 1, wherein the metadata is for a region of a texture of the graphics hardware incompatible compressed textures.

9. The computer device of claim 1, wherein the trained machine learning model uses the metadata to increase a speed of the conversion of the graphics hardware incompatible compressed textures into hardware compatible compressed textures.

10. The computer device of claim 1, wherein the hardware compatible compressed textures are in a format of a block compressed number (BCN) texture, and
wherein the GPU is renders textures from the hardware compatible compressed textures to present on a display.

11. A method for generating hardware compatible compressed textures, comprising:
- receiving, by an application executing on a computer device, graphics hardware incompatible compressed textures in a format incompatible with a graphics processing unit (GPU);
- providing information to a trained machine learning model for identifying metadata to use during a conversion of the hardware incompatible compressed textures into hardware compatible compressed textures; and
- converting the graphics hardware incompatible compressed textures into hardware compatible compressed textures usable by the GPU using the trained machine learning model and the identified metadata.

12. The method of claim 11, wherein the machine learning model uses the metadata to select configurations for a block compression of the graphics hardware incompatible compressed textures.

13. The method of claim 12, wherein the configurations for the block compression produce hardware compatible compressed textures with minimum image artifacts compared to original source images.

14. The method of claim 11, wherein the information identifies a format of the graphics hardware incompatible compressed textures and the machine learning model selects the metadata in response to the format.

15. The method of claim 11, wherein the information identifies a hardware compatible format for the GPU and the machine learning model selects the metadata in response to the hardware compatible format for the GPU.

16. The method of claim 11, wherein the information identifies a type of texture included in the hardware incompatible compressed textures and the machine learning model selects the metadata in response to the type of texture.

17. The method of claim 11, wherein the metadata is for one or more of an identified texture of the graphics hardware incompatible compressed textures or a region of a texture of the graphics hardware incompatible compressed textures.

18. The method of claim 11, wherein the trained machine learning model uses the metadata to increase a speed of the conversion of the graphics hardware incompatible compressed textures into hardware compatible compressed textures.

19. The method of claim 11, wherein the hardware compatible compressed textures are in a format of a block compressed number (BCN) texture, and
wherein the GPU renders textures from the hardware compatible compressed textures to present on a display.

20. A non-transitory computer-readable medium storing instructions executable by a computer device, comprising:
- at least one instruction for causing the computer device to receive the graphics hardware incompatible compressed textures;
- at least one instruction for causing the computer device to provide information to a trained machine learning model for identifying metadata to use during a conversion of the hardware incompatible compressed textures into hardware compatible compressed textures; and
- at least one instruction for causing the computer device to convert the graphics hardware incompatible compressed textures into hardware compatible compressed textures usable by the GPU using the trained machine learning model and the identified metadata.

* * * * *